United States Patent [19]

Nitta et al.

[11] Patent Number: 4,728,079
[45] Date of Patent: Mar. 1, 1988

[54] CABLE PULLING APPARATUS

[75] Inventors: Tadanori Nitta; Takami Terai; Yasutaka Hasegawa, all of Mura; Takeshi Kurashima, Yokohama; Nobuo Sekiguchi; Tsutomu Enari, both of Sagamihara, all of Japan

[73] Assignees: Nipon Telegraph & Telephone, Corp.; Showa Elec. Wire & Cable Co., both of Japan

[21] Appl. No.: 779,419

[22] Filed: Sep. 24, 1985

[30] Foreign Application Priority Data

Oct. 11, 1984 [JP] Japan .................. 59-213112

[51] Int. Cl.⁴ ............................... B65H 59/00
[52] U.S. Cl. ........................ 254/134.3 FT; 74/13
[58] Field of Search .......... 254/134.3 FT, 134.3 R; 73/862.48; 226/25, 172; 74/13

[56] References Cited

U.S. PATENT DOCUMENTS

| 3,106,325 | 10/1963 | Kitching | 254/134.3 R X |
| 4,372,535 | 2/1983 | Gibson et al. | 254/134.3 R X |
| 4,456,225 | 6/1984 | Lucas | 254/134.3 FT |
| 4,461,459 | 7/1984 | Conti | 254/134.3 FT |
| 4,468,003 | 8/1984 | Nonclerq et al. | 254/134.3 FT |
| 4,502,666 | 3/1985 | Mattelon et al. | 254/134.3 FT |
| 4,508,251 | 4/1985 | Harada et al. | 226/172 X |
| 4,576,362 | 3/1986 | Langston | 254/134.3 FT |

Primary Examiner—Robert C. Watson
Attorney, Agent, or Firm—Lorusso & Loud

[57] ABSTRACT

A cable pulling apparatus includes a driving sheave on which is wound a tow line detachably connected to one end of a cable to be pulled; a pulling device disposed between the driving sheave and the end of the tow line and adapted to pull the tow line, a tension detector disposed between the driving sheave and the end of the cable and adapted to detect the pulling tension in the cable, and a control means for controlling the traction device in accordance with the tension detected by the tension detector such that, when the tension detected by the tension detector is below a predetermined limit, the pulling speed is controlled to impart a tension which is comparatively small but large enough to prevent any slip of the tow line on the periphery of the driving sheave, whereas, when the tension detected by the tension detector exceeds the predetermined level, the pulling speed is decreased such as to cause a slip of the tow line on the outer periphery of the driving sheave.

7 Claims, 7 Drawing Figures

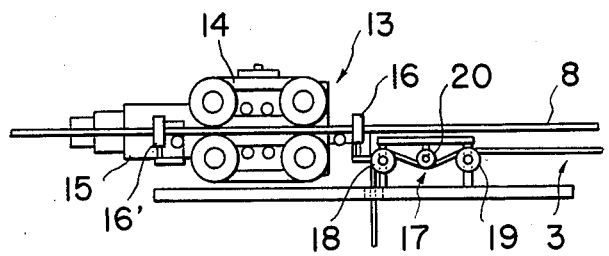

CABLE PULLING APPARATUS

BACKGROUND OF THE INVENTION

1. Field of the Invention

The present invention relates to a cable pulling apparatus which is designated for pulling a communication cable through a pipe or conduit which has been burried under the ground.

2. Related Art Statement

FIG. 2 is a sectional view illustrating a related art for laying a communication cable through an underground conduit, while FIG. 3 is an enlarged perspective view showing the manner in which a tow line is threaded around a driving sheave. Referring to these Figures, a tow line 3 is connected to one end of a cable 2 which is to be towed and laid in a cable conduit 1. The tow line 3 passes around a guide sheave 5 disposed in a manhole 4 and, after making several turns on a driving sheave 7 which is attached to, for example, a driving wheel axle 11 of a vehicle such as a truck 6 parked on the ground, extends as denoted by 8 past rollers 9. A numeral 10 designates a driving wheel of the vehicle 6. The end 8 of the tow line 3 threaded in the described manner is taken up in the direction of an arrow 12 by human power and, when the tension is increased to a predetermined level, the tow line is drawn by the force of the driving sheave 7 which in turn is driven by the power of the vehicle 6. As the manual take-up force is reduced, the tow line 3 starts to slip on the outer periphery of the driving sheave 7 so that the pulling force is reduced and there is no traction when the load of the cable has become large. In laying a cable by this method, the pulling power on the cable can be controlled through adjustment of the manual take-up force on the cable. Actually, however, such a control, i.e., repetitional start and stop of the traction, is conducted in accordance with a sign or cue given by persons which are stationed at suitable locations such as the cable feed-in position or other places where they can watch the laying. Therefore, in some cases, the cable pulling force cannot be quickly changed responsive to an excessive tension which may be caused in the cable. Therefore, this method cannot cannot be used where the allowable tension must be strictly controlled, as in the case of laying an optical fiber cable.

SUMMARY OF THE INVENTION

The above-described drawbacks in related art apparatus have been successfully eliminated by the present invention.

A first object of the invention is to provide a cable pulling apparatus which is capable of laying a cable without imparting any excessive tension to the cable.

A second object of the invention is to provide a cable pulling apparatus which has a driving means for taking up a tow line which is extended past a driving sheave and a tension detecting means, wherein the tension detected by the tension detecting means is compared with a predetermined value and the pulling means is adjusted in accordance with the result of the detection.

To these ends, according to the invention, there is provided a cable pulling apparatus comprising: a driving sheave on which is wound a tow line detachably connected to one end of a cable to be pulled; a pulling means disposed between the driving sheave and the end of the tow line and adapted to tract the tow line; a tension detecting means disposed between the driving sheave and the end of the cable and adapted to detect the traction tension in the cable; and a control means for controlling the pulling device in accordance with the tension detected by the tension detecting means.

These and other objects of the invention will become apparent from the following description of the embodiments thereof when taken together with the drawings.

BRIEF DESCRIPTION OF THE DRAWINGS

FIGS. 4a to 4c show pulling means and tension detecting means in a cable pulling apparatus embodying the present invention; and FIG. 5 is a block diagram of a control means incorporated in the embodiment of FIGS. 4a to 4c.

DETAILED DESCRIPTION OF THE PREFERRED EMBODIMENTS

Figure 1:
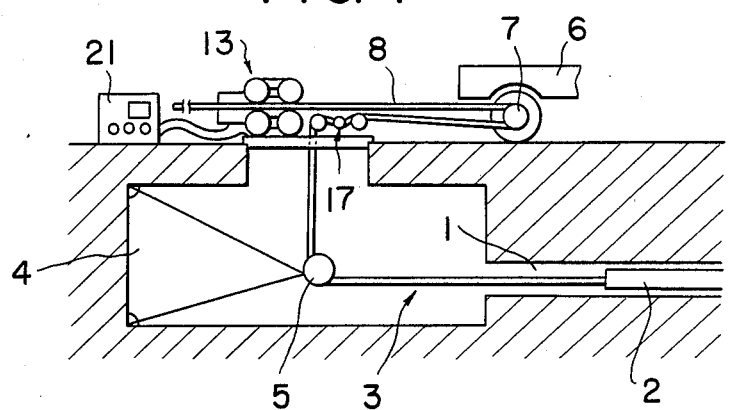
FIG. 1 is a schematic illustration of a method of pulling a cable in accordance with the invention, together with a manhole which is shown in section.
Figure 2:
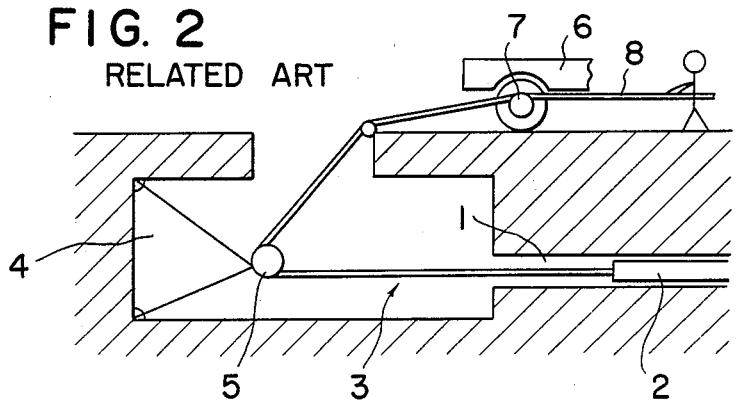
FIG. 2 is an illustration of a related art device for pulling a cable.

FIG. 1 shows the general arrangement of an embodiment of the invention, in which the same reference numerals are used to denote the same parts or members as those used in FIG. 2. As will be seen from this Figure, a cable pulling apparatus in accordance with the invention has a pulling device 13 which is adapted to take-up the leading end of a tow line 3. A tension detector 17 is disposed along the path of the tow line 3.

FIGS. 4a, 4b and 4c are a front elevational view, a plan view and a side elevational view of an assembly constituted by the pulling device 13 and the tension detector 17. In these Figures, the pulling device 13 has a pair of endless belts 14 adapted to pull the tow line pinched therebetween in one direction, a driving motor 15 for the endless belts 14 and tow line guide rollers 16, 16' which are disposed at upstream and downstream sides of the endless belts 14. The tension detector 17 includes a central pressing roller 20 and guide rollers 18 and 19 which are disposed at the front side and rear side of the central roller 20.

The pulling device 13 is designed for taking up the leading end of the tow line 3 which has been led past the driving sheave 7, and is composed of a front guide roller device 16 consisting of a pair of vertical rollers arranged one above and one below the tow line 3, a pair of endless belts 14 adapted to be driven by a motor 15, and a rear guide roller device 16' having a construction similar to that of the front guide roller device 16. The tension detector 17 is disposed between the cable 2 and a driving sheave 7 and is composed of two guide rollers 18, 19 through which the tow line 3 is passed and a pressing roller 20 which is disposed between two guide rollers 18, 19 and adapted to press the tow line 3 from the upper side. The arrangement is such that the tension in the tow line is detected through sensing the reaction force which is imparted by the tow line 3 to the pressing roller 20. The tension is converted into an electric signal which is inputted to a tension controller 21 shown in a block diagram in FIG. 5.

The controller 21 is constituted by the following parts: a voltage amplifier circuit 22 for amplifying an electric signal from the tension detector 17; a voltage comparator circuit 23 for comparing the amplified output of the amplifier circuit 22 with a reference voltage which represents a predetermined set value of tension, i.e., the maximum allowable tension in the cable during laying, which is set beforehand by a reference voltage setting device 24 capable of setting the tension in accordance with the cable laying conditions; a current limiting circuit 26 which controls the electric current supplied to the motor 15 of the pulling device 13 in accordance with the output from the voltage comparator circuit 23; and a power supply circuit 25.

Figure 3:
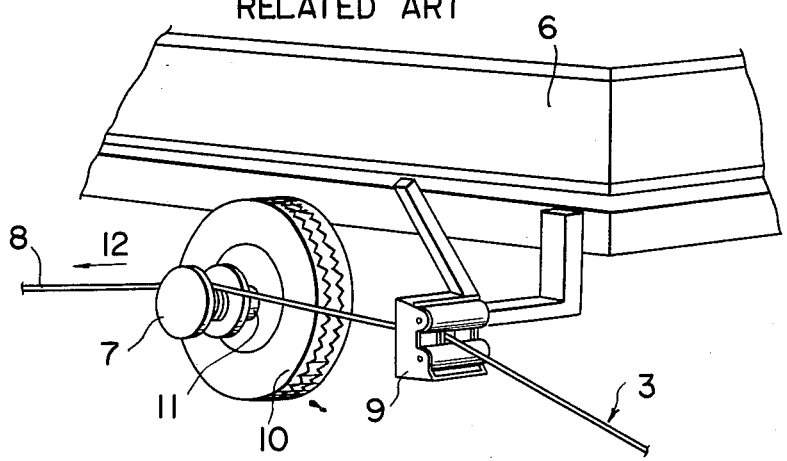
FIG. 3 is a perspective view of showing a portion of the related art device with a driving sheave.

In operation of the cable pulling apparatus of the invention, the tow line 3 is detachably connected to the leading end of the cable 2 to be pulled and laid and, as shown in FIG. 1, threaded past the guide sheave 5 in the manhole 4, tension detector 17 on the ground and, after making several turns on a driving sheave 7 (directly connected to the wheel axle 11 of the driving wheel 10 of the vehicle 6—See Fig. 3), past the pulling device 13 to the line end. Thereafter, the driving sheave 7 is driven by the power of the engine of the vehicle 6 and the pulling device 13 is driven by the motor 15 so that the towing line 3 is pulled to two the cable 2.

When the tension detected by the tension detector 17 is below a predetermined level, the pulling device 13 operates such as to produce a tension in tow line 3 which is comparatively small but large enough to avoid any slip on the peripheral surface of the driving sheave 7. Practically, the operation may be such that the end 8 of the tow line 3 is taken up substantially at the same speed as the line pulling speed of the driving sheave 7. Since the tow line is not stretchable, any mismatch of speed between the driving sheave and the pulling device 13 may cause a fluctuation in the tension of the section of the two line between the driving sheave 7 and the pulling device 13. Therefore, it is preferred that a constant torque control be provided such that the tow line 3 is always under a tension which is greater than a predetermined value. From this point of view, according to the invention, control is provided such that the electric current supplied by the power source circuit 25 in accordance with the voltage comparator circuit 23 is limited to a constant value by the current limiting circuit 26 before supplied to the motor 15. In this case, a D.C. shunt type motor, which exhibits little speed fluctuation in response to the load variation, is used as the motor 15.

When the tension in the tow line has come to exceed a predetermined level, the controller 21 operates in response to the tension detector 17 so that the motor 15 is the traction device 13 is decelerated to reduce the pulling force on the end 8 of the tow line. Consequently, the tow line 3 slips on the outer peripheral surface of the driving sheave 7, thereby stopping movement of the cable 2 connected thereto. After the elimination of the cause of excessive rise in the tension, the tension detector 17 detects that the tension in the cable has fallen below the predetermined limit and operates to increase the speed of the motor 15. As a consequence, the end 8 of the tow line is pulled so that the tow line 3 on the driving sheave 7 is frictionally held again thus commencing the laying of the cable.

Needless to say, the control fo the speed of take-up by the pulling device 13 can be controlled by adjusting the voltage applied to the armature. However, the construction of the controller will be simplified if the arrangement is such that the pulling torque is controlled in relation to the load as in the described embodiment.

The invention does not exclude the use of a device having a drum on which the tow line is wound as the pulling device and the use of a load transducer for detecting a strain in the guide sheave disposed in the manhole as the tension detector.

As has been described, in the operation of the cable pulling apparatus of the invention, the tension in the cable is continuously detected and, when the tension has become greater than a predetermined limit, the speed of the pulling device is decreased so that the tow line is made to slip on the driving sheave, thereby stopping the pulling of the cable. When the tension has fallen below the predetermined limit, the speed of the pulling device is increased to the normal speed so that the driving sheave commences the pulling of the cable again.

The cable pulling apparatus of the invention, therefore, can avoid any tension in excess of a predetermined limit in the pulled cable and, hence, can be used suitably in the pulling of communication cable, particularly an optical fiber cable in which the transmission characteristics would be impaired by an excessive tension. Namely, in such uses, the cable pulling apparatus of the invention can improve the efficiency of the cable laying work while reducing the labour of workers without impairing the transmission characteristics of the cable, as compared with the conventional cable laying system.

Thus, there is provided in accordance with the invention a cable pulling apparatus which has the advantage discussed above. The embodiments described herein are intended to be merely exemplary and those skilled in the art will be able to make variations and modifications without departing from the spirit and scope of the invention. All such modifications and variations are contemplated as falling within the scope of the claims.

What is claimed is:

1. A cable pulling apparatus comprising:
    a driving sheave which is adapted to receive, wound thereon, a tow line detachably connected to one end of a cable to be pulled;
    a prime mover for driving said driving sheave;
    pulling means adapted to pull the tow line received from said driving sheave;
    stationary tension monitoring means disposed for contacting the tow line and detecting the tension in the tow line prior to its reaching said driving sheave and for generating a tension control signal representative of said detected tension; and
    control means for controlling the pulling speed of said pulling means responsive to said tension control signal to regulate slip of the cable on said driving sheave so that the tension imparted to said tow line by said pulling means allows the tow line to slip on said driving sheave when the detected tension is above a predetermined value and does not allow said slip at a detected tension below said predetermined value.

2. A cable pulling apparatus in accordance with claim 1 wherein said tension monitoring means comprises a first roller member mounted for reciprocating movement in contact with said tow line.

3. A cable pulling apparatus in accordance with claim 2 wherein said movement is along a line perpendicular to the line of travel of the tow line.

4. A cable pulling apparatus in accordance with claim 3 wherein said first roller is spaced between second and third rollers, said second and third rollers bearing against said tow line from the side opposite said first roller.

5. A cable pulling apparatus according to claim 1, wherein said pulling means has a pair of endless belts which are adapted to pinch said tow line therebetween.

6. The apparatus of claim 1 wherein said prime mover is a vehicle mounted internal combustion engine and said driving sheave is mounted on an axle of said vehicle driven by said internal combustion engine.

7. The apparatus of claim 6 wherein said pulling means comprises an electric motor and the speed of said electric motor is regulated by said tension control signal.

* * * * *